(12) United States Patent
Ueno et al.

(10) Patent No.: US 7,466,906 B2
(45) Date of Patent: Dec. 16, 2008

(54) MOTOR CONTROL APPARATUS

(75) Inventors: Hiroshi Ueno, Seto (JP); Mayumi Komatsu, Kasugai (JP)

(73) Assignee: OMRON Corporation, Kyoto (JP)

( * ) Notice: Subject to any disclaimer, the term of this patent is extended or adjusted under 35 U.S.C. 154(b) by 234 days.

(21) Appl. No.: 11/594,609

(22) Filed: Nov. 8, 2006

(65) Prior Publication Data

US 2007/0104468 A1    May 10, 2007

(30) Foreign Application Priority Data

Nov. 8, 2005   (JP)   ............... 2005-323065

(51) Int. Cl.
*G05F 1/101* (2006.01)
(52) U.S. Cl. .............. 388/815; 318/432; 318/801; 318/808
(58) Field of Classification Search ............... 388/815; 318/432, 891, 808, 812, 479, 650, 635, 599, 318/800
See application file for complete search history.

(56) References Cited

U.S. PATENT DOCUMENTS 509,717 A * 11/1893 Brown et al. ............... 15/262

5,758,741 A    6/1998  Tomioka

FOREIGN PATENT DOCUMENTS

| JP | 6-51474 | 7/1994 |
|---|---|---|
| JP | 2003-153584 | 5/2003 |
| JP | 2003-200845 | 7/2003 |
| JP | 2005-51951 | 2/2005 |

\* cited by examiner

*Primary Examiner*—Karen Masih
(74) *Attorney, Agent, or Firm*—Osha · Liang LLP

(57) ABSTRACT

A motor control apparatus includes a target value computation device which computes a target value of a current to be passed through a motor, a current detection device which detects a current passed through the motor, a command value computation device which computes a command value to the motor based on a deviation between the target value and the current value, a motor drive circuit which drives the motor based on the command value, a boosting circuit which boosts a voltage supplied to the motor, a judgment device which judges whether the command value exceeds a predetermined threshold, a rate-of-charge computation device which computes a rate of change of the command value to time, and a boosting control device which controls an boosting operation of the boosting circuit based on a result of the judgment device and the rate of change of the command value.

9 Claims, 11 Drawing Sheets

MOTOR CONTROL APPARATUS

BACKGROUND OF THE INVENTION

1. Field of the Invention

The present invention relates to motor control in an electric power steering apparatus and the like, particularly to boosting control of power supply voltage supplied to a motor.

2. Description of the Related Art

The electric power steering apparatus imparts steering assist force by an electric motor when a driver steers a steering wheel of a vehicle. FIG. 11 is a block diagram showing an example of the electric power steering apparatus. In FIG. 11, the numeral 50 designates a steering wheel (hereinafter referred to as "handle") provided in a driver's seat of the vehicle, the numeral 51 designates a shaft whose one end is coupled to the handle 50, the numeral 52 designates a torque sensor which detects a torque applied to the shaft 51 during the steering, and the numeral 53 designates a gear mechanism coupled to the other end of the shaft 51. The numeral 54 designates an electric motor which generates the steering assist force, and the numeral 55 designates a transmission mechanism which transmits the steering force of the handle 50 and the steering assist force of the motor 54 to wheels 56 through the gear mechanism 53. The numeral 57 designates a current detector which detects current being passed through the motor 54, and the numeral 58 designates a speed sensor which detects running speed of the vehicle. The numeral 59 designates a battery which supplies power supply voltage for driving the motor 54, the numeral 60 designates a boosting circuit which boosts the voltage of the battery 59, and the numeral 61 designates a controller including an electronic control unit (ECU) which controls the motor 54.

When the handle 50 is steered, the torque sensor 52 detects the torque which is generated in the shaft 51 by the steering, and the controller 61 computes a target value of the current to be passed through the motor 54 based on the torque value and speed detected by the speed sensor 58. A motor drive circuit (not shown) incorporated in the controller 61 supplies the current to the motor 54 based on the current target value, and the motor 54 is rotated to generate the steering assist force. The current of the motor 54 is detected by the current detector 57, and the detected current value is inputted to the controller 61. The controller 61 compares the detected current value and the current target value, and the controller 61 computes a command value based on a deviation between the detected current value and the current target value. For example, in a case where the motor drive circuit includes a switching element turned on and off by a PWM (Pulse Width Modulation) signal and the voltage is applied to the motor according to a duty ratio of the PWM signal, the duty ratio becomes the command value. The controller 61 performed feedback control based on the command value such that the current having the target value is passed through the motor 54.

For example, Japanese Examined Patent Publication No. H6-51474 described the electric power steering apparatus.

In the electric power steering apparatus, assuming that the voltage of the battery 59 is set at 12 volts, because the current of tens amperes is passed through the battery 59 in the maximum load (running at an extremely low speed or the like) of the steering assist by the motor 54, the motor driving power supply voltage imparted to the controller 61 is decreased due to voltage drop caused by internal resistance of the battery 59. In the controller 61, the voltage drop is also generated in the switching element or the like. Furthermore, the voltage drop is generated in a cable connecting the controller 61 and the motor 54. As a result, the voltage actually supplied to the motor 54 is decreased to about seven volts. Therefore, the torque of the motor 54 is decreased to result in a problem that the steering assist force is not sufficiently obtained.

In order to deal with the problem, in FIG. 11, the boosting circuit 60 is provided to boost the voltage of the battery 59. For example, the boosting circuit 60 includes an oscillation circuit which outputs a pulse, the switching element which performs a switching operation with the pulse, a coil which repeats accumulation/release of electric energy by the switching operation to generate the high voltage, and a capacitor which smoothes the boosted voltage. For example, Japanese Unexamined Patent Application No. 2005-51951 describes the detailed boosting circuit. The boosted voltage can be imparted to the motor 54 to obtain the large steering assist force by providing the boosting circuit 60.

However, in the conventional apparatus, because the boosting circuit 60 always supplies the boosted voltage to the motor 54, the switching element constantly repeats the on/off operation in the boosting circuit 60, which results in the problem that power loss is increased in the switching element. There is a possible method, in which a threshold is set to the command value (for example, PWM signal duty ratio), the voltage is not boosted by the boosting circuit until the command value exceeds the threshold, and the voltage is not boosted by the boosting circuit when the command value exceeds the threshold. Therefore, when the command value exceeds the threshold, namely, only when the boosting is required, the switching element performs the on/off operation to boost the voltage, so that the power loss can be suppressed in the switching element. For example, Japanese Unexamined Patent Application No. 2003-153584 and Japanese Unexamined Patent Application No. 2003-200845 describe such boosting control techniques.

In Japanese Unexamined Patent Application No. 2003-153584 and Japanese Unexamined Patent Application No. 2003-200845, the PWM signal duty ratio is computed based on the command value computed from the deviation between the target value and the detected value of the motor current. The voltage is not boosted when the computed duty ratio is not more than 100%. When the computed duty ratio exceeds 100%, the switching element is turned on and off at the duty ratio corresponding to the excess amount of computed duty ratio, which allows the boosted voltage to be supplied to the motor drive circuit according to the excess amount of computed duty ratio.

SUMMARY OF THE INVENTION

In the method of boosting the voltage when the command value exceeds the threshold like Japanese Unexamined Patent Application No. 2003-153584 and Japanese Unexamined Patent Application No. 2003-200845, the boosting is continued while the command value exceeds the threshold. However, even if the command value exceeds the threshold once, the command value is decreased with time, and sometimes the command value falls below the threshold. In this case, because the boosting is not required for the motor, the continuation of the boosting operation causes the generation of the wasteful power loss in the switching element of the boosting circuit.

Therefore, the problem to be solved by the invention is to stop the boosting to enable the power loss to be further decreases compared with the conventional apparatus, when the boosting is not required even if the command value exceeds the threshold.

A motor control apparatus according to a first aspect of the invention including target value computation means for computing a target value of a current to be passed through a motor; current detection means for detecting the current being passed through the motor, to output a current value thereof; command value computation means for computing a command value to the motor based on a deviation between the current target value computed by the target value computation means and the current value detected by the current detection means; motor drive means for driving the motor based on the command value computed by the command value computation means; and a boosting circuit which boosts a voltage supplied to the motor, the motor control apparatus is characterized by providing judgment means for judging whether or not the command value computed by the command value computation means exceeds a predetermined threshold; rate-of-change computation means for computing a rate of change of the command value to time; and boosting control means for controlling an boosting operation of the boosting circuit based on a judgment result by the judgment means and the rate of change of the command value computed by the rate-of-change computation means.

A motor control apparatus according to a second aspect of the invention including target value computation means for computing a target value of a current to be passed through a motor; current detection means for detecting the current being passed through the motor, to output a current value thereof; command value computation means for computing a command value to the motor based on a deviation between the current target value computed by the target value computation means and the current value detected by the current detection means; motor drive means for driving the motor based on the command value computed by the command value computation means; and a boosting circuit which boosts a voltage supplied to the motor, the motor control apparatus is characterized by providing voltage detection means for detecting a power supply voltage of the motor; threshold determination means for determining a threshold based on the motor power supply voltage detected by the voltage detection means; judgment means for judging whether or not the command value computed by the command value computation means exceeds the threshold determined by the threshold determination means; rate-of-change computation means for computing a rate of change of the command value to time; and boosting control means for controlling an boosting operation of the boosting circuit based on a judgment result by the judgment means and the rate of change of the command value computed by the rate-of-change computation means.

In the first and second aspects of the invention, whether or not the boosting is required is not judged based only on whether or not the command value exceeds the threshold, but, in addition to this, the whether or not the boosting is required is also judged based on how the command value is changed to the time. Therefore, even if the command value exceeds the threshold, in a case where it is judged from the state of the change in command value that the boosting is not required, the boosting operation can be stopped to eliminate the wasteful power loss in the boosting circuit.

Specifically, for example, in a case where the judgment means judges that the command value exceeds the predetermined threshold, the boosting control means controls the boosting circuit so as to boost the voltage supplied to the motor when the rate of change of the command value computed by the rate-of-change computation means is a positive value (command value increase), and the boosting control means controls the boosting circuit so as not to boost the voltage supplied to the motor when the rate of change of the command value computed by the rate-of-change computation means is a negative value (command value decrease).

In a preferred mode of the first and second aspects of the invention, the threshold includes a first threshold and a second threshold. In a case where the judgment means judges that the command value exceeds the first threshold, the boosting control means controls the boosting circuit so as to boost the voltage supplied to the motor when the rate of change of the command value is a positive value (command value increase), and the boosting control means controls the boosting circuit so as not to boost the voltage supplied to the motor when the rate of change of the command value is a negative value (command value decrease). In a case where the judgment means judges that the command value exceeds the second threshold, the boosting control means controls the boosting circuit so as to boost the voltage supplied to the motor independently of the positive or negative value of the rate of change of the command value. Accordingly, even if the command value exceeds the first threshold, in a case where the command value is decreased, the boosting operation can be stopped to eliminate the wasteful power loss. In a case where the command value exceeds the second threshold, it is judged that the continuation of boosting is required, and the boosting operation is not stopped even if the command value is decreased, which allows the boosted voltage to be stably supplied to the motor.

A motor control apparatus according to a third aspect of the invention including target value computation means for computing a target value of a current to be passed through a motor; current detection means for detecting the current being passed through the motor, to output a current value thereof; command value computation means for computing a command value to the motor based on a deviation between the current target value computed by the target value computation means and the current value detected by the current detection means; motor drive means for driving the motor based on the command value computed by the command value computation means; and a boosting circuit which boosts a voltage supplied to the motor, the motor control apparatus is characterized by providing revolution speed detection means for detecting the motor revolution speed; judgment means for judging whether or not the motor revolution speed detected by the revolution speed detection means exceeds a predetermined threshold; rate-of-change computation means for computing a rate of change of the revolution speed to time; and boosting control means for controlling an boosting operation of the boosting circuit based on a judgment result by the judgment means and the rate of change of the revolution speed computed by the rate-of-change computation means.

In the third aspect of the invention, whether or not the boosting is required is not judged based on only whether or not the revolution speed exceeds the threshold, but, in addition to this, the whether or not the boosting is required is also judged based on how the revolution speed is changed to the time. Therefore, even if the revolution speed exceeds the threshold, in a case where it is judged from the state of the change in the revolution speed that the boosting is not required, the boosting operation can be stopped to eliminate the wasteful power loss in the boosting circuit.

Specifically, for example, in a case where the judgment means judges that the revolution speed exceeds the predetermined threshold, the boosting control means controls the boosting circuit so as to boost the voltage supplied to the motor when the rate of change of the revolution speed computed by the rate-of-change computation means is a positive value (command value increase), and the boosting control means controls the boosting circuit so as not to boost the voltage supplied to the motor when the rate of change of the revolution speed computed by the rate-of-change computation means is a negative value (command value decrease).

In a preferred mode of the third aspect of the invention, the threshold includes a first threshold and a second threshold. In a case where the judgment means judges that the revolution-speed exceeds the first threshold, the boosting control means controls the boosting circuit so as to boost the voltage supplied to the motor when the rate of change of the revolution speed is a positive value (revolution speed increase), and the boosting control means controls the boosting circuit so as not to boost the voltage supplied to the motor when the rate of change of the revolution speed is a negative value (revolution speed decrease). In a case where the judgment means judges that the revolution speed exceeds the second threshold, the boosting control means controls the boosting circuit so as to boost the voltage supplied to the motor independently of the positive or negative value of the rate of change of the revolution speed. Accordingly, even if the revolution speed exceeds the first threshold, in a case where the revolution speed is decreased, the boosting operation can be stopped to eliminate the wasteful power loss. In a case where the revolution speed exceeds the second threshold, it is judged that the continuation of boosting is required, and the boosting operation is not stopped even if the revolution speed is decreased, which allows the boosted voltage to be stably supplied to the motor.

According to the invention, even if the command value or the revolution speed exceeds the threshold, whether or not the boosting is required is judged based on the rate of change of the command value or the revolution speed. Therefore, in a case where the boosting is not required, the boosting can be stopped to eliminate the wasteful power consumption in the boosting circuit. Accordingly, the energy loss can further be decreased compared with the conventional apparatus in which the boosting operation is continued as long as the command value or the like exceeds the threshold.

DETAILED DESCRIPTION OF THE PREFERRED EMBODIMENTS

Embodiments in a case where the invention is applied to an electric power steering apparatus will be described below with reference to the drawings. A basic configuration of the electric power steering apparatus is similar to that shown in FIG. 11, so that FIG. 11 will be cited as embodiments of the invention in the following description.

Figure 1:
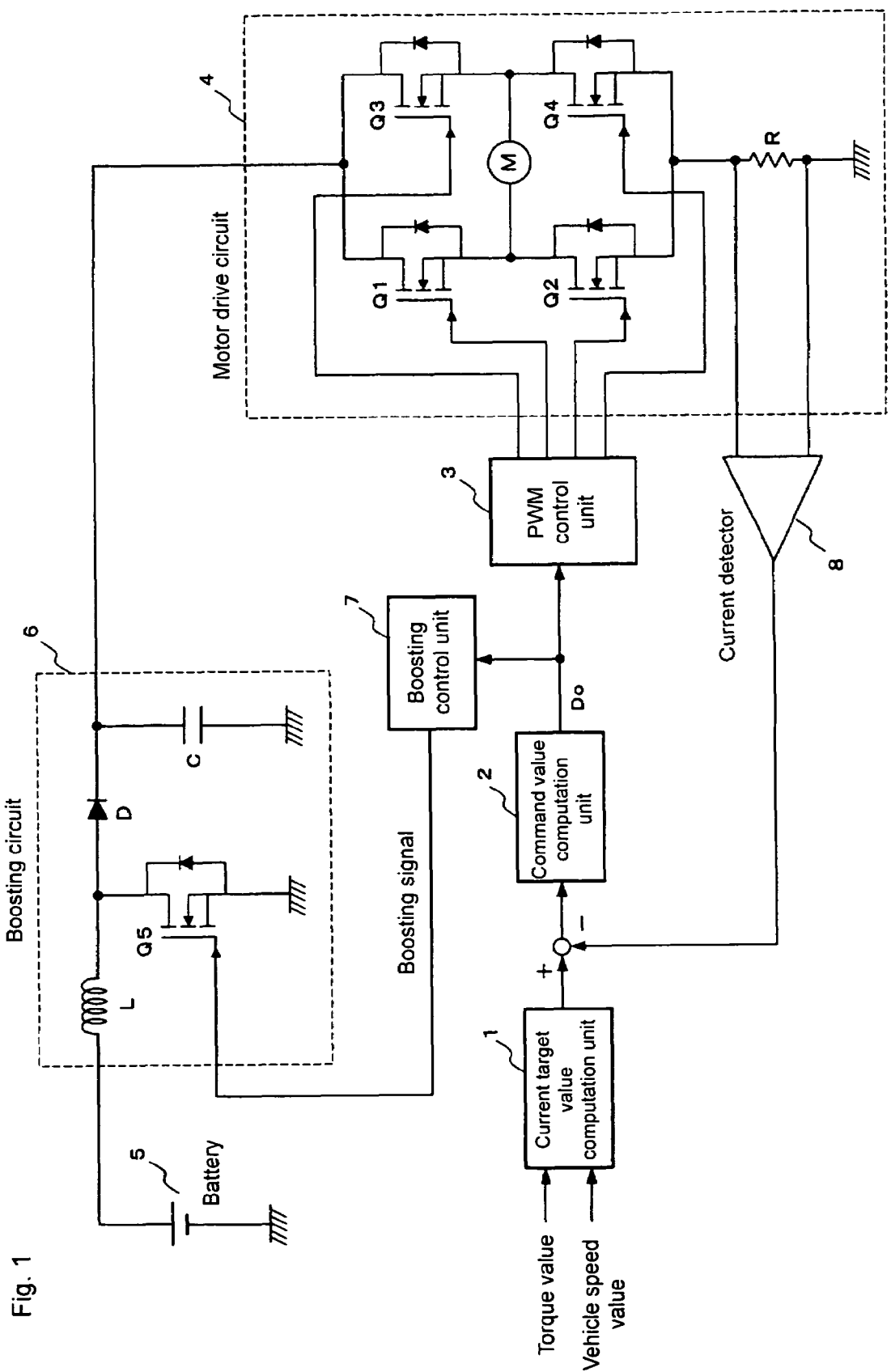
FIG. 1 shows a circuit diagram illustrating an example of a motor control apparatus according to a first embodiment of the invention.
Figure 11:
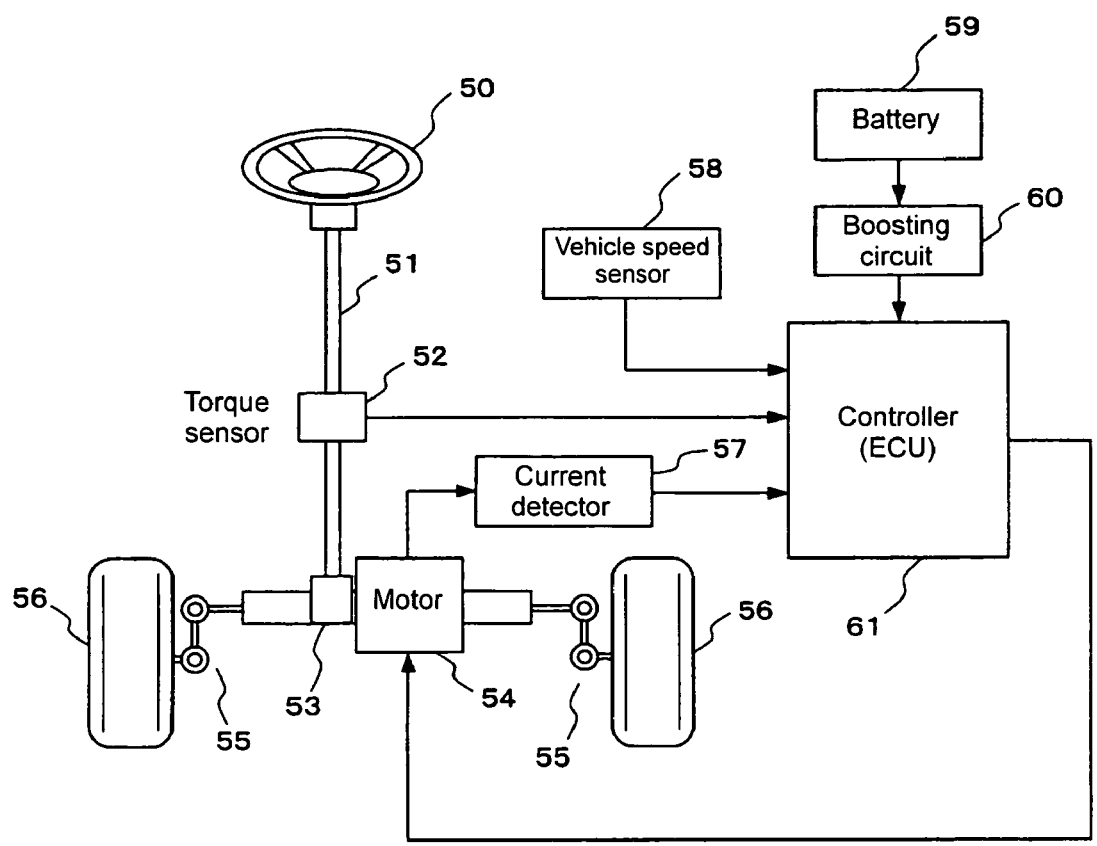
FIG. 11 shows a block diagram illustrating an example of an electric power steering apparatus.

FIG. 1 is a circuit diagram showing an example of a motor control apparatus according to a first embodiment of the invention. The motor control apparatus is formed by blocks of a current target value computation unit 1, a command value computation unit 2, a PWM (Pulse Width Modulation) control unit 3, a motor drive circuit 4, a battery 5, a boosting circuit 6, a boosting control unit 7, and a current detector 8. The current target value computation unit 1, the command value computation unit 2, the PWM control unit 3, the motor drive circuit 4, and the boosting control unit 7 are the blocks included in the controller 61 shown in FIG. 11. The battery 5, the boosting circuit 6, and the current detector 8 are blocks corresponding to the battery 59, the boosting circuit 60, and the current detector 57 in FIG. 11. In FIG. 1, sensors corresponding to the torque sensor 52 and speed sensor 58 of FIG. 11 are omitted.

The current target value computation unit 1 computes the target value of the current to be passed through the motor M based on the torque value detected by the torque sensor and the speed value detected by the speed sensor. The command value computation unit 2 computes the command value to the motor M based on the deviation between the current target value computed by the current target value computation unit 1 and the current value of the motor current detected by the current detector 8. The command value is a parameter with which the feedback control is performed such that the current having the target value is passed through the motor M, and the command value is computed as the PWM signal duty ratio. The PWM control unit 3 generates the PWM signal of the duty ratio according to the command value computed by the command value computation unit 2.

The PWM signal outputted from the PWM control unit 3 is imparted to the motor drive circuit 4. The motor drive circuit 4 is a well-known circuit which includes a bridge circuit having four switching elements Q1 to Q4. One end of the bridge circuit is connected to the boosting circuit 6, and the other end is grounded through a resistance R. The motor M is connected between the junction point of the switching elements Q1 and Q2 and a junction point of the switching elements Q3 and Q4. In this case, the switching elements Q1 to Q4 are formed by a MOS-type FET (Field Effect Transistor). Alternatively, instead of the MOS-type FET, the switching elements Q1 to Q4 may be formed by an element such as IGBT (Insulated Gate Bipolar Transistor).

In this state of things, for example, in a case where the steering assist force is imparted by the motor M to the rightward steering of the handle, the PWM control unit 3 inputs the PWM signal to the gates of the switching elements Q1 and Q4. Then, the switching element Q1 and Q4 become the on state only for a period corresponding to a pulse width of the PWM signal, the voltage having the value corresponding to the command value (duty ratio) is applied to the motor M, and the current corresponding to the applied voltage is passed through the motor M. Therefore, the motor M is rotated in one direction to generate the rightward torque having magnitude corresponding to the passed current, i.e., the steering assist force.

On the other hand, in a case where the steering assist force is imparted by the motor M to the leftward steering of the handle, the PWM control unit 3 inputs the PWM signal to the gates of the switching elements Q2 and Q3. Then, the switching element Q2 and Q3 become the on state only for the period corresponding to the pulse width of the PWM signal, the voltage having the value corresponding to the command value (duty ratio) is applied to the motor M, and the current corresponding to the applied voltage is passed through the motor M. Therefore, the motor M is rotated in the other direction to generate the leftward torque having magnitude corresponding to the passed current, i.e., the steering assist force.

Thus, the current is passed through the motor M according to the PWM signal imparted to the motor drive circuit 4 from the PWM control unit 3, and the motor M generates the torque according to the current value, so that the predetermined steering assist force is obtained. Because the current being passed through the motor M is passed through the resistance R, the current detector 8 connected to the resistance R detects the current value of the motor current. As described above, the detected current value is used when the command value computation unit 2 computes the command value.

The boosting circuit 6 boosts the voltage of the battery 5 and supplies the boosted voltage to the motor drive circuit 4. The boosting circuit 6 is a well-known circuit including a switching element Q5 formed by the MOS-type FET, a boosting coil L, a rectifying diode D, and a smoothing capacitor C. The switching element Q5 performs the on/off operation based on a boosting signal from the later-mentioned boosting control unit 7. The coil L repeats accumulation/release of the electric energy to generate the high voltage by the on/off operation of the switching element Q5. The generated high voltage is rectified by the diode D and smoothed by the capacitor C, and the high voltage is imparted to the motor drive circuit 4.

The boosting control unit 7 judges whether or not the command value (duty ratio) computed by the command value computation unit 2 exceeds a predetermined threshold, and the boosting control unit 7 computes the rate of change of the command value to the time. Then, the boosting control unit 7 controls the boosting operation of the boosting circuit 6 based on the judgment result and the rate of change of the command value. In performing the boosting operation, the boosting control unit 7 outputs the boosting signal which is of a pulse signal having a predetermined duty ratio. The boosting signal is imparted to the gate of the switching element Q5 of the boosting circuit 6, and the voltage of the battery 5 is boosted based on the on/off operation of the switching element Q5. In a case where the boosting operation is not performed, the boosting control unit 7 does not output the boosting signal.

In the above configuration, the current target value computation unit 1 is an embodiment of the target value computation means in the invention, the command value computation unit 2 is an embodiment of the command value computation means in the invention, the PWM control unit 3 and the motor drive circuit 4 are an embodiment of the motor drive means in the invention, the boosting control unit 7 is an embodiment of the judgment means, rate-of-change computation means, and boosting control means in the invention, and the current detector 8 is an embodiment of the current detection means in the invention.

Then, the detailed control operation of the boosting control unit 7 in the first embodiment will be described with reference to FIGS. 2 and 3.

Figure 2:
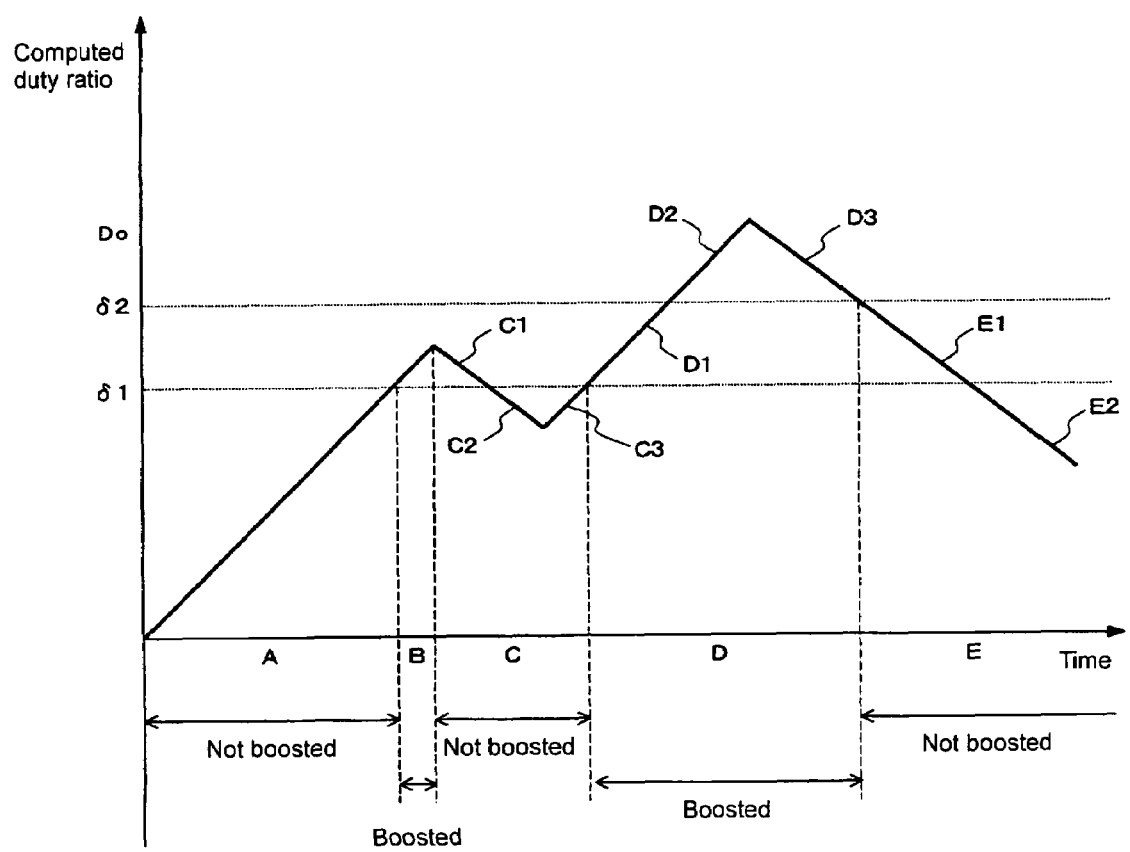
FIG. 2 shows a graph illustrating an example of boosting control.

FIG. 2 is a graph showing an example of the boosting control. A horizontal axis indicates the time, and a vertical axis indicates the command value, i.e., the duty ratio computed by the command value computation unit 2 (hereinafter referred to as "computed duty ratio"). In the first embodiment, two thresholds of $\delta 1$ (first threshold) and $\delta 2$ (second threshold) are set as the threshold to the computed duty ratio Do in the boosting control unit 7. A relationship of $\delta 1 < \delta 2$ holds between $\delta 1$ and $\delta 2$. For example, $\delta 1$ is set to 90% and $\delta 2$ is set to 95% with respect to the computed duty ratio of 100%. The computed duty ratio Do is temporally changed by the torque value and speed value inputted to the current target value computation unit 1, so that the computed duty ratio Do exceeds or falls below the thresholds $\delta 1$ and $\delta 2$.

In FIG. 2, a range A is a region where the computed duty ratio Do is continuously increased. However, the boosting is not required in the range A because the computed duty ratio Do does not reach the threshold $\delta 1$ yet. Therefore, the boosting control unit 7 does not output the boosting signal, and the boosting circuit 6 does not perform the boosting operation.

In a range B, the computed duty ratio Do exceeds the threshold $\delta 1$ and the computed duty ratio Do is still continuously increased. At this point, the rate of change of the computed duty ratio Do to the time has a positive value. In such cases, the boosting control unit 7 judges that the boosting is required, and the boosting control unit 7 outputs the boosting signal to impart the boosting signal to the boosting circuit 6. Therefore, the boosting circuit 6 performs the boosting operation.

In an initial part C1 of a range C, the computed duty ratio Do shift to the decrease although the computed duty ratio Do exceeds the threshold $\delta 1$. At this point, the rate of change of the computed duty ratio Do to the time has a negative value. In such cases, the boosting control unit 7 judges that the boosting is not required, and the boosting control unit 7 stops the output of the boosting signal. Therefore, the boosting circuit 6 does not perform the boosting operation. In a part C2, because the computed duty ratio Do falls below the threshold $\delta 1$, the boosting is not required and the stopped state of the boosting is continued. In a part C3, although the computed duty ratio Do shifts to the increase, the computed duty ratio Do does not reach the threshold $\delta 1$, so that the boosting operation is still stopped.

In an initial part D1 of a range D, the computed duty ratio Do exceeds the threshold $\delta 1$ and the computed duty ratio Do is continuously increased. Therefore, as with the range B, the boosting control unit 7 outputs the boosting signal and the boosting circuit 6 performs the boosting operation. In a part D2, the computed duty ratio Do exceeds the threshold $\delta 2$ and the computed duty ratio Do is still increased, so that the boosting operation is continued. In a part D3, although the computed duty ratio Do exceeds the threshold $\delta 2$, the computed duty ratio Do shifts to the decrease. However, in this case, the boosting control unit 7 does not judge that the boosting is not required, but the boosting control unit 7 continues the boosting operation. This is because, in the state where the computed duty ratio Do exceeds the threshold $\delta 2$, the computed duty ratio Do becomes a value close to 100% to require the stable boosting operation. When the boosting is stopped in the part D3, timing of the start of the boosting is delayed due to time lag in a case where the computed duty ratio Do shifts to the increase to resume the boosting, which loses the stability of the boosting operation.

In an initial part E1 of a range E, the computed duty ratio Do falls below the threshold $\delta 2$ and the computed duty ratio Do is continuously decreased. Therefore, as with the part C1 of the range C, the boosting control unit 7 judges that the boosting is not required, the boosting control unit 7 stops the output of the boosting signal, and thereby the boosting circuit 6 does not perform the boosting operation. In a part E2, because the computed duty ratio Do falls below the threshold δ1, as with the part C2 of the range C, the stopped state of the boosting is continued.

Figure 3:
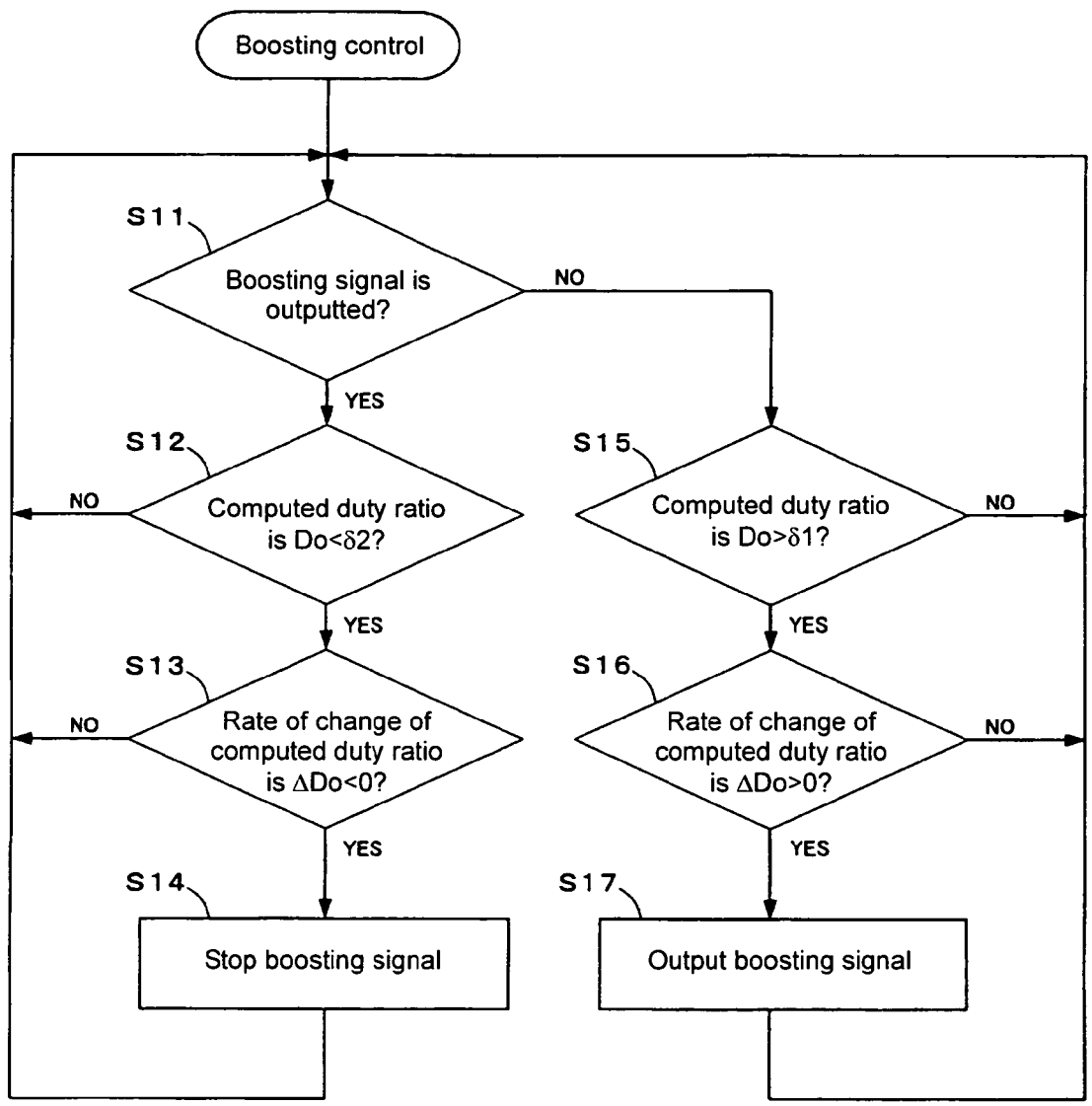
FIG. 3 shows a flowchart illustrating a procedure of the boosting control according to the first embodiment.

FIG. 3 is a flowchart showing a procedure of the boosting control according to the first embodiment. The procedure shown in FIG. 3 shows a procedure performed by the boosting control unit 7. In Step S11, it is judged whether or not the boosting signal is outputted from the boosting control unit 7. When the boosting signal is outputted (Step S11: YES), the flow goes to Step S12 to judge whether the computed duty ratio Do falls below the threshold δ2. When the computed duty ratio Do does not falls below the threshold δ2 (Step S12: NO), the output of the boosting signal is continued (parts D2 and D3 of FIG. 2), and the flow returns to Step S11. When the computed duty ratio Do falls below the threshold δ2 (Step S12: YES), the flow goes to Step S13 to judge whether or not a rate of change ΔDo of the computed duty ratio Do is the negative value. When the rate of change ΔDo is the positive value (Step S13: NO), the output of the boosting signal is continued (parts B and D1 of FIG. 2), and the flow returns to Step S11. When the rate of change ΔDo is the negative value (Step S13: YES), the flow goes to Step S14 to stop the boosting signal (parts C1 and E1 of FIG. 2), and the flow returns to Step S11.

When the boosting signal is not outputted in Step S11 (Step S11: NO), the flow goes to Step S15 to judge whether or not the computed duty ratio Do exceeds the threshold δ1. When the computed duty ratio Do does not exceed the threshold δ1 (Step S15: NO), the stop of the boosting signal is continued (parts A, C2, C3, and E2 of FIG. 2), and the flow returns to Step S11. When the computed duty ratio Do exceeds the threshold δ1 (Step S15: YES), the flow goes to Step S16 to judge whether or not the rate of change ΔDo of the computed duty ratio Do has the positive value. When the rate of change ΔDo has negative value (Step S16: NO), the stop of the boosting signal is continued (parts C1 and E1 of FIG. 2), and the flow returns to Step S11. When the rate of change ΔDo has the positive value (Step S13: YES), the flow goes to Step S17 to output the boosting signal (parts B and D1 of FIG. 2), and the flow returns to Step S11.

Thus, in the first embodiment, whether or not the boosting is required is not judged based only on whether or not the computed duty ratio Do exceeds the threshold, but, in addition to this, the whether or not the boosting is required is also judged based on the rate of change ΔDo of the computed duty ratio Do to the time. Therefore, even if the computed duty ratio Do exceeds the threshold δ1, in a case where it is judged from the rate of change ΔDo that the boosting is not required (C1 and E1 of FIG. 2), the boosting operation can be stopped to eliminate the wasteful power loss in the boosting circuit 6.

In the first embodiment, the two thresholds δ1 and δ2 are used as the threshold. In a case where the computed duty ratio Do exceeds the threshold δ1, the boosting circuit 6 is controlled so as to boost the voltage when the rate of change ΔDo of the computed duty ratio has the positive value (parts B and D1 of FIG. 2), and the boosting circuit 6 is controlled not so as to boost the voltage when the rate of change ΔDo has the negative value (parts C1 and E1 of FIG. 2). On the other hand, in a case where the command value exceeds the threshold δ2 (parts D2 and D3 of FIG. 2), the boosting circuit 6 is controlled so as to boost the voltage independently of the positive or negative value of the rate of change ΔDo of the computed duty ratio. Accordingly, even if the computed duty ratio Do exceeds the threshold δ1, in a case where the computed duty ratio Do is decreased, the boosting operation can be stopped to eliminate the wasteful power loss. In a case where the computed duty ratio Do exceeds the threshold δ2, because the boosting operation is not stopped even if the computed duty ratio Do is decreased, the boosted voltage to can stably be supplied to the motor M.

When the computed duty ratio exceeds 100% to initially start the boosting, sometimes boosting start timing is not ready in time for the motor drive based on the duty ratio imparted to the PWM control unit 3. However, in the first embodiment, because the threshold δ1 is set at the computed duty ratio of 90% below the computed duty ratio of 100%, the boosting can early be started and the delay is not generated in the boosting operation. In a case where the boosting is not required after the boosting is started, the power loss can be minimized because the boosting operation is stopped at that time. Furthermore, when compared with the one threshold, the boosting control can finely be performed by setting the two thresholds δ1 and δ2.

Figure 4:
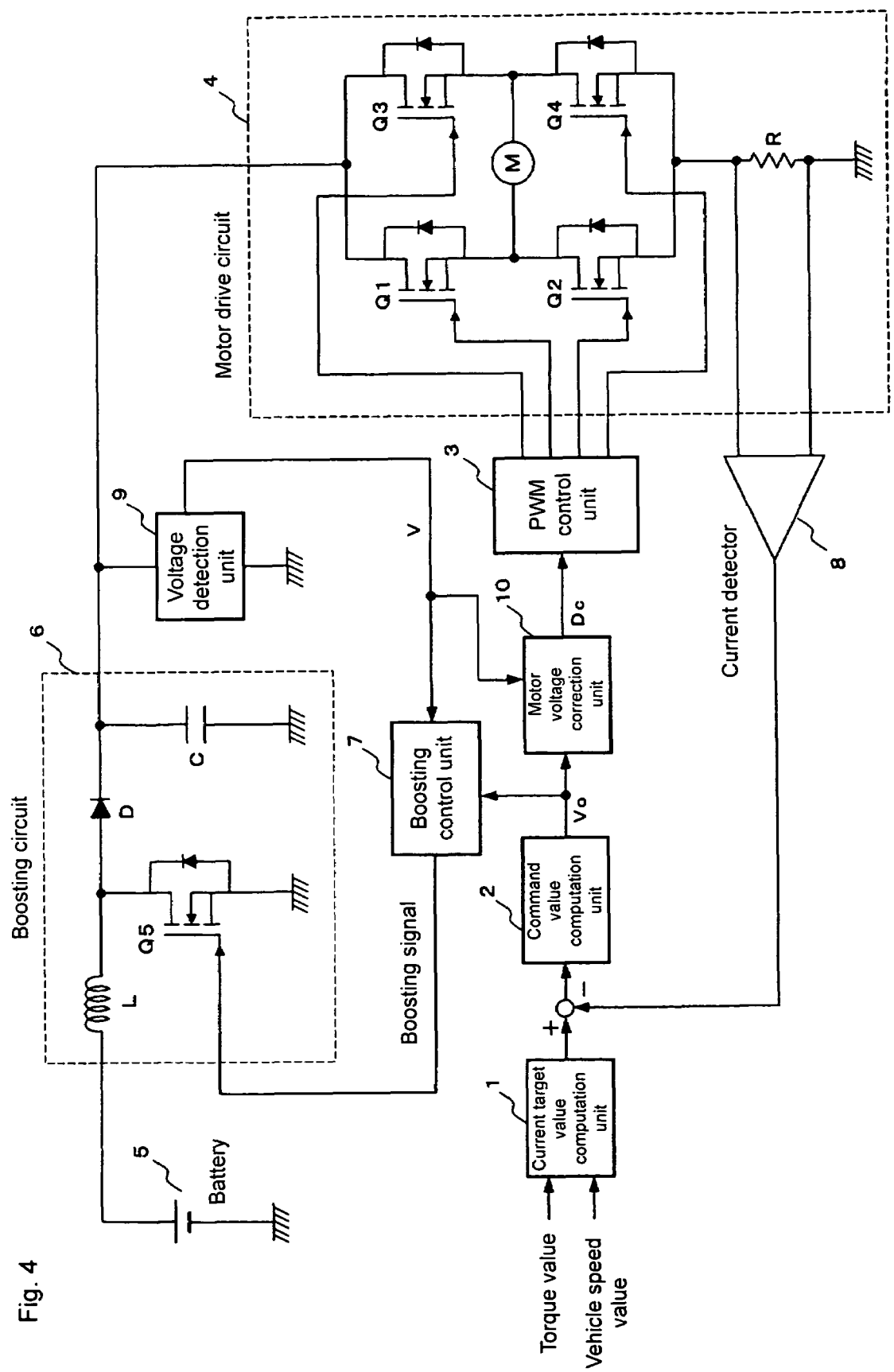
FIG. 4 shows a circuit diagram illustrating an example of a motor control apparatus according to a second embodiment of the invention.

FIG. 4 is a circuit diagram showing an example of a motor control apparatus according to a second embodiment of the invention. In the second embodiment, a fluctuation in battery voltage is detected to correct the voltage applied to the motor. The voltage of the battery 5 is not kept constant but the voltage fluctuates due to various factors. Therefore, it is desired that the fluctuation in battery voltage have no influence on the motor voltage. In FIG. 4, a voltage detection unit 9 and a motor voltage correction unit 10 are provided in addition to the configuration of FIG. 1. Because other blocks of the second embodiment are basically similar to those of FIG. 1, the same block as that of FIG. 1 is designated by the same numeral and the detailed description is neglected.

In FIG. 4, the voltage detection unit 9 is connected to the output side of the boosting circuit 6 to detect the power supply voltage of the motor M. The reason why the voltage detection unit 9 is connected to the output side of the boosting circuit 6 is that, because the characteristics of the coil L is changed by temperature to shift the boosted voltage value from a theoretical value, the actual motor voltage cannot correctly be detected when the voltage detection unit 9 is connected to the input side of the boosting circuit 6. A voltage value V detected by the voltage detection unit 9 and a command value Vo computed by the command value computation unit 2 are inputted to the motor voltage correction unit 10. In this case, the command value Vo is a voltage value, and the command value Vo is referred to as "voltage command value." The motor voltage correction unit 10 computes a corrected computed duty ratio Dc from the following equation based on the voltage value V and the voltage command value Vo.

$$Dc=(Vo/V)\cdot 100\%$$

In the equation, the value of 100% is used as the computed duty ratio Dc, in a case where voltage command value Vo becomes larger than the voltage value V and the computed duty ratio Dc exceeds 100%.

Figure 5:
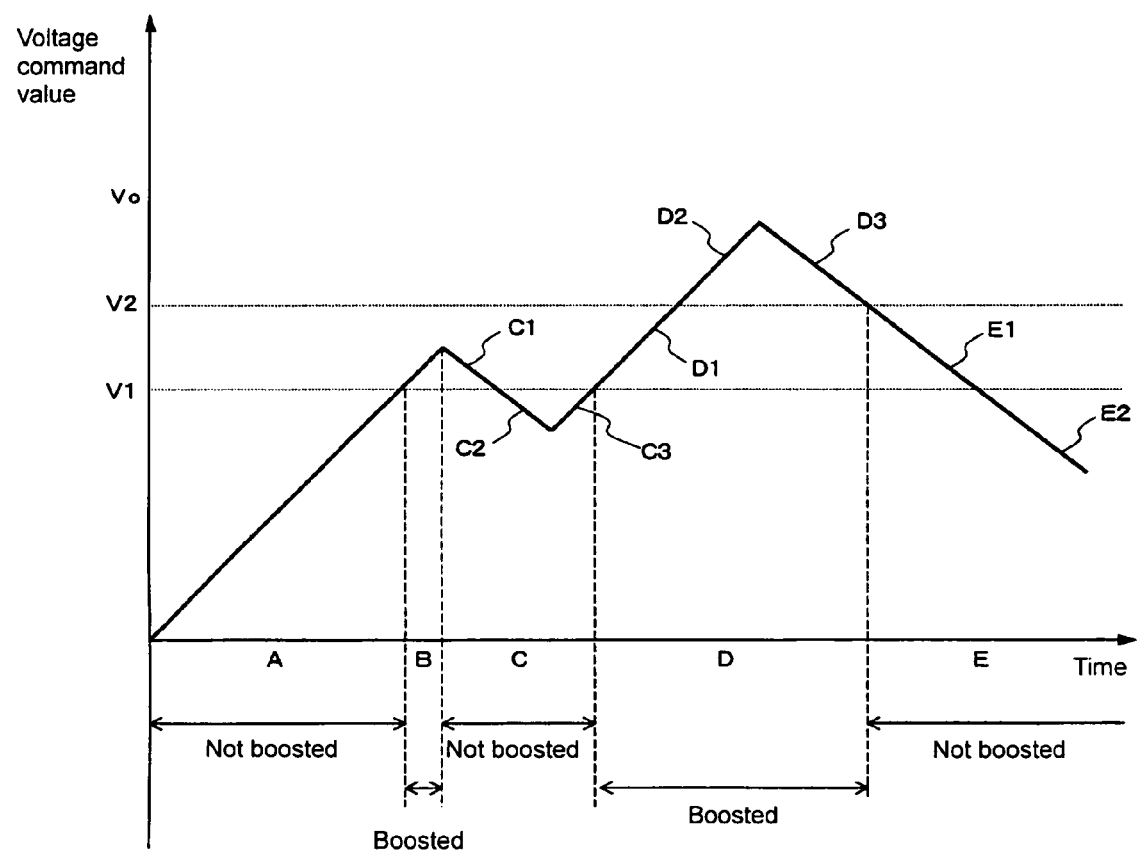
FIG. 5 shows a graph illustrating an example of the boosting control.

The voltage value V detected by the voltage detection unit 9 is also inputted to the boosting control unit 7. The boosting control unit 7 determines the threshold to the voltage command value Vo based on the voltage value V. As shown in FIG. 5, two thresholds of V1 (first threshold) and V2 (second threshold) are used as the threshold, and the two thresholds are computed by V1=V×90% and V2=V×95%.

In the above configuration, the current target value computation unit 1 is an embodiment of the target value computation means in the invention, the command value computation unit 2 and the motor voltage correction unit 10 are an embodiment of the command value computation means in the invention, the PWM control unit 3 and the motor drive circuit 4 are an embodiment of the motor drive means in the invention, the boosting control unit 7 is an embodiment of the judgment means, rate-of-change computation means, boosting control means, and threshold determination means in the invention, the current detector 8 is an embodiment of the current detection means in the invention, and the voltage detection unit 9 is an embodiment of the voltage detection means in the invention.

FIG. 5 is a graph showing an example of the boosting control. A horizontal axis indicates the time, and a vertical axis indicates the command value, i.e., the voltage command value Vo computed by the command value computation unit 2. The numerals V1 and V2 designate the threshold. FIG. 5 is basically similar to FIG. 2, and FIG. 5 differs from FIG. 2 only in that the computed duty ratio Do in the vertical axis of FIG. 2 is replaced by the voltage command value Vo in FIG. 5 and the thresholds δ1 and δ2 in FIG. 2 is replaced by the thresholds V1 and V2 in FIG. 5. Accordingly, FIG. 5 will briefly be described below.

In FIG. 5, in the range A, because the voltage command value Vo does not reach the threshold V1, the boosting control unit 7 does not output the boosting signal and the boosting circuit 6 does not perform the boosting operation. In the range B, the voltage command value Vo exceeds the threshold V1 and the rate of change also has the positive value. Therefore, the boosting control unit 7 outputs the boosting signal and the boosting circuit 6 performs the boosting operation. In the part C1 of the range C, although the voltage command value Vo exceeds the threshold V1, the rate of change has the negative value. Therefore, the output of the boosting signal is stopped and the boosting operation is not performed. In the part C2, because the voltage command value Vo falls below the threshold V1, the voltage is not boosted. In the part C3, although the voltage command value Vo shifts to the increase, the voltage command value Vo does not reach the threshold V1. Therefore, the boosting operation is still stopped. In the part D1 of the range D, the voltage command value Vo exceeds the threshold V1 and the voltage command value Vo is continuously increased, so that the voltage is boosted. In the part D2, the voltage command value Vo exceeds the threshold V2 and the voltage command value Vo is continuously increased, so that the boosting operation is continued. In the part D3, the voltage command value Vo exceeds the threshold V2. Therefore, due to the above-described reason, the boosting operation is continued although the voltage command value Vo shifts to the decrease. In the part E1 of the range E, the voltage command value Vo falls below the threshold V2 and the voltage command value Vo is continuously decreased, so that the boosting operation is stopped. In the part E2, because the voltage command value Vo falls below the threshold V1, the stopped state of the boosting is continued.

Figure 6:
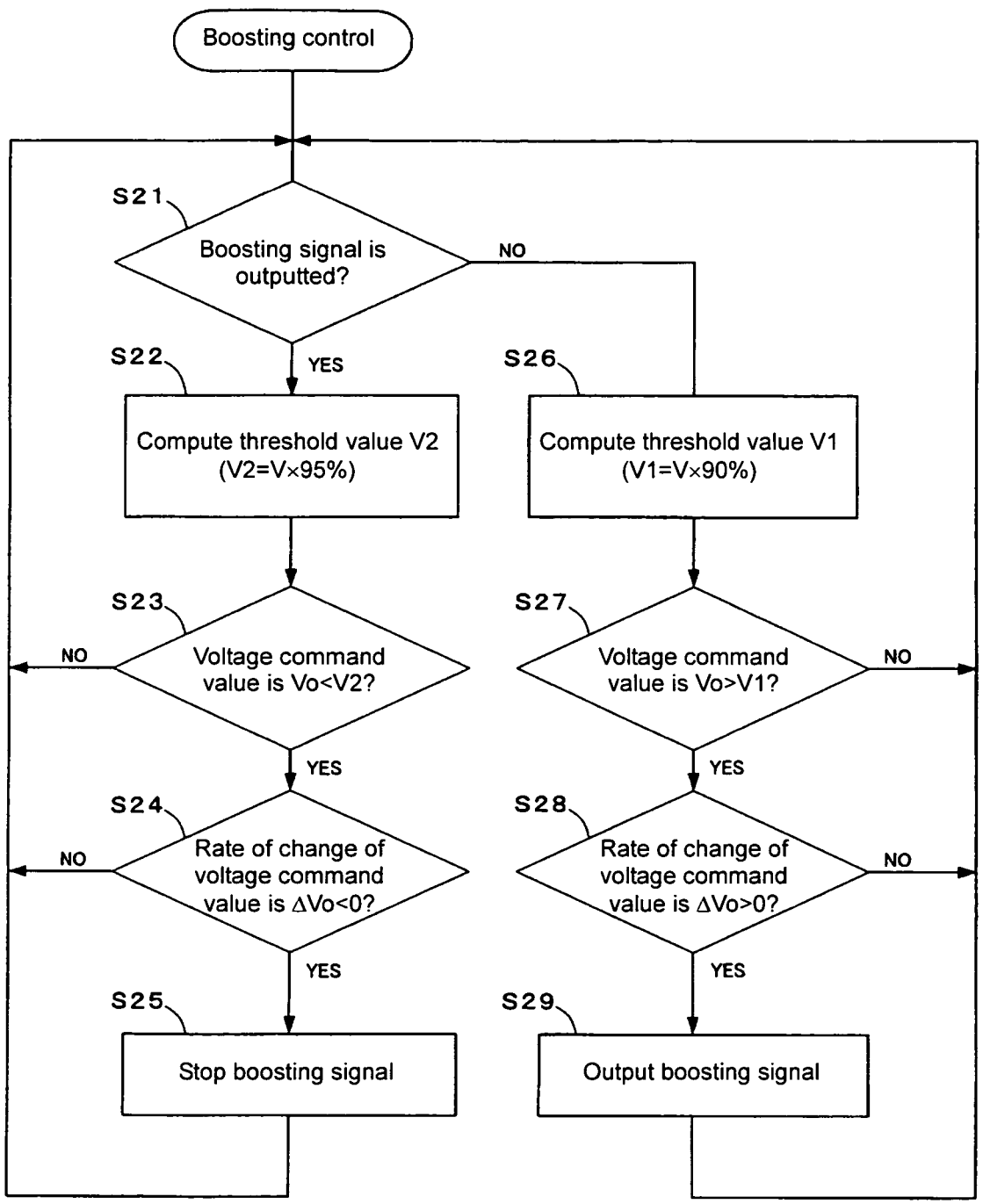
FIG. 6 shows a flowchart illustrating a procedure of the boosting control according to the second embodiment.

FIG. 6 is a flowchart showing a procedure of the boosting control according to the second embodiment. The procedure shown in FIG. 6 shows a procedure performed by the boosting control unit 7. In Step S21, it is judged whether or not the boosting signal is outputted from the boosting control unit 7. When the boosting signal is outputted (Step S21: YES), the flow goes to Step S22 to compute the threshold V2. As described above, the threshold V2 is computed by V2=V× 95%. Then, the flow goes to Step S23 to judge whether or not the voltage command value Vo falls down the threshold V2. When the voltage command value Vo does not falls below the threshold V2 (Step S23: NO), the output of the boosting signal is continued (parts D2 and D3 of FIG. 5), and the flow returns to Step S21. When the voltage command value Vo falls below the threshold V2 (Step S23: YES), the flow goes to Step S24 to judge whether or not a rate of change ΔVo of the voltage command value Vo is the negative value. When the rate of change ΔVo is the positive value (Step S24: NO), the output of the boosting signal is continued (parts B and D1 of FIG. 5), and the flow returns to Step S21. When the rate of change ΔVo is the positive value (Step S24: NO), the output of the boosting signal is continued (parts B and D1 of FIG. 5), and the flow returns to Step S21. When the rate of change ΔVo is the negative value (Step S24: YES), the flow goes to Step S25 to stop the boosting signal (parts C1 and E1 of FIG. 5), and the flow returns to Step S21.

When the boosting signal is not outputted in Step S21 (Step S21: NO), the flow goes to Step S26 to compute the threshold V1. As described above, the threshold V1 is computed by V1=V×90%. Then, the flow goes to Step S27 to judge whether or not the voltage command value Vo exceeds the threshold V1. When the voltage command value Vo does not exceed the threshold V1 (Step S27: NO), the stop of the boosting signal is continued (parts A, C2, C3, and E2 of FIG. 5), and the flow returns to Step S21. When the voltage command value Vo exceeds the threshold V1 (Step S27: YES), the flow goes to Step S28 to judge whether or not the rate of change ΔVo of the voltage command value Vo is the positive value. When the rate of change ΔVo is negative value (Step S28: NO), the stop of the boosting signal is continued (steps C1 and E1 of FIG. 5), and the flow returns to Step S21. When the rate of change ΔVo is the positive value (Step S28: YES), the flow goes to Step S29 to output the boosting signal (parts B and D1 of FIG. 5), and the flow returns to Step S21.

Thus, in the second embodiment, whether or not the boosting is required is not judged based only on whether or not the voltage command value Vo exceeds the threshold, but, in addition to this, the whether or not the boosting is required is also judged based on the rate of change ΔVo of the computed duty ratio Do to the time. Therefore, even if the voltage command value Vo exceeds the threshold V1, in a case where it is judged from the rate of change ΔVo that the boosting is not required (C1 and E1 of FIG. 5), the boosting operation can be stopped to eliminate the wasteful power loss in the boosting circuit 6.

In the second embodiment, the two thresholds V1 and V2 are used as the threshold. In a case where the voltage command value Vo exceeds the threshold V1, the boosting circuit 6 is controlled so as to boost the voltage when the rate of change ΔVo of the voltage command value is the positive value (parts B and D1 of FIG. 25, and the boosting circuit 6 is controlled not so as to boost the voltage when the rate of change ΔVo is the negative value (parts C1 and E1 of FIG. 5). On the other hand, in a case where the voltage command value Vo exceeds the threshold V2 (parts D2 and D3 of FIG. 5), the boosting circuit 6 is controlled so as to boost the voltage independently of the positive or negative value of the rate of change ΔVo of the computed duty ratio. Accordingly, even if the voltage command value Vo exceeds the threshold V1, in a case where the voltage command value Vo is decreased, the boosting operation can be stopped to eliminate the wasteful power loss. In a case where the voltage command value Vo exceeds the threshold V2, because the boosting operation is not stopped even if the voltage command value Vo is decreased, the boosted voltage to can stably be supplied to the motor M.

Figure 7:
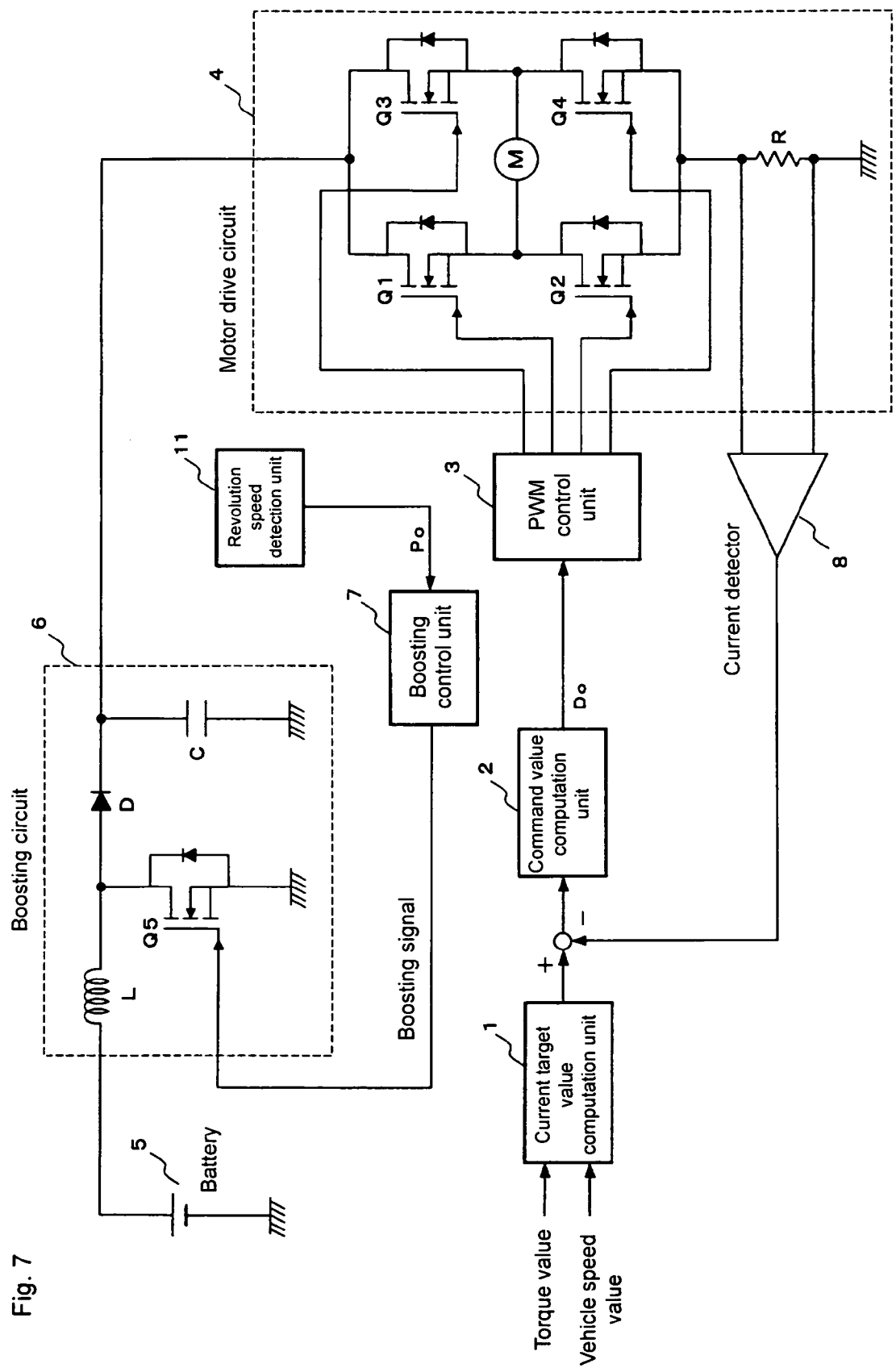
FIG. 7 shows a circuit diagram illustrating an example of a motor control apparatus according to a third embodiment of the invention.

Because the threshold V1 of the voltage command value is set at 90% of the power supply voltage V, as with the first embodiment, the boosting can early be started and the delay is not generated in the boosting operation. In a case where the boosting is not required after the boosting is started, the power loss can be minimized because the boosting operation is stopped at that time. Furthermore, when compared with the one threshold, the boosting control can finely be performed by setting the two thresholds V1 and V2.

FIG. 7 is a circuit diagram showing an example of a motor control apparatus according to a third embodiment of the invention. In the third embodiment, instead of the command value of the above-described embodiments, the revolution speed of the motor is used to perform the boosting control. Therefore, in FIG. 7, a revolution speed detection unit 11 which detects the revolution speed of the motor M is provided in addition to the configuration of FIG. 1. In FIG. 1, the command value (computed duty ratio) computed by the command value computation unit 2 is imparted to the boosting control unit 7. On the contrary, in FIG. 7, the command value is not imparted to the boosting control unit 7. Because other blocks of the third embodiment are basically similar to those of FIG. 1, the same block as that of FIG. 1 is designated by the same numeral and the detailed description is neglected.

Figure 8:
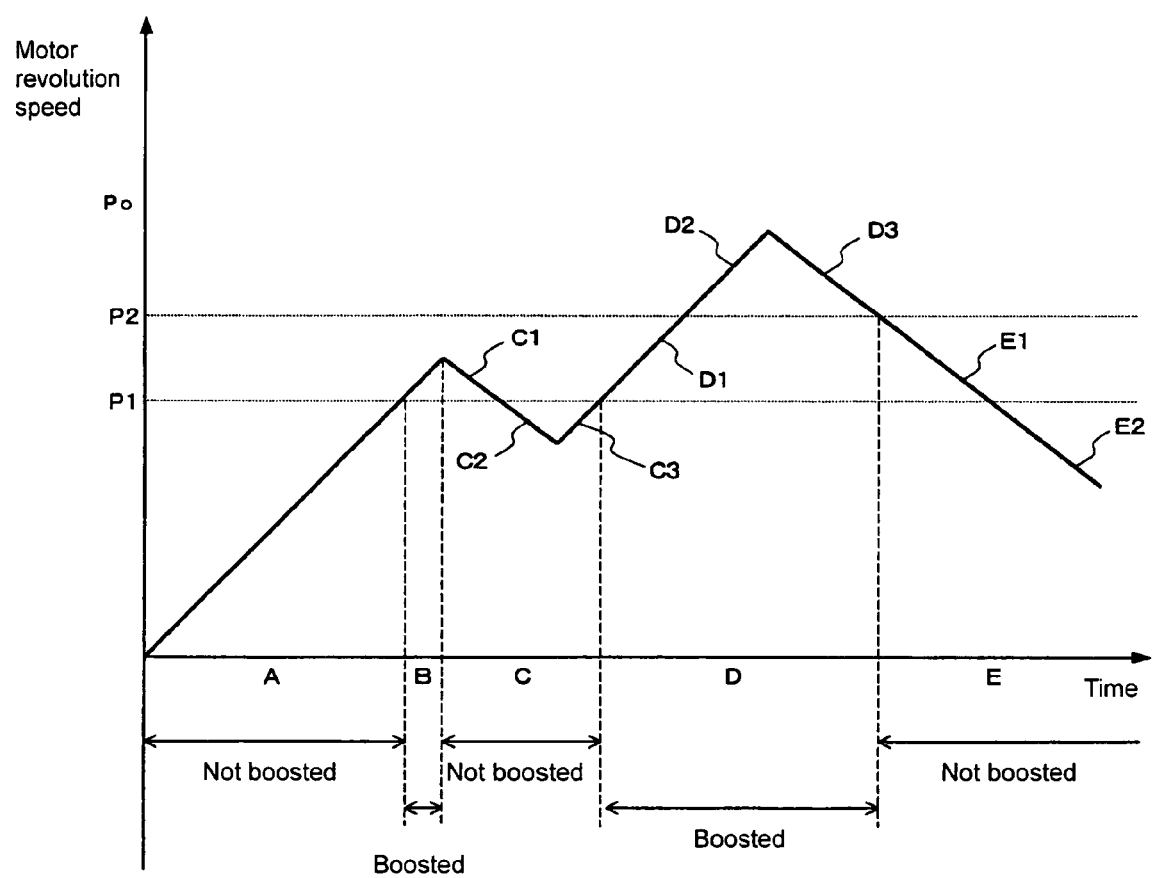
FIG. 8 shows a graph illustrating an example of the boosting control.

In FIG. 7, for example, the revolution speed detection unit 11 includes a rotary encoder, a pulse detection circuit, and a computation circuit. The rotary encoder generates a pulse signal synchronous with the rotation of the motor M. The pulse detection circuit detects the pulse signal outputted from the rotary encoder. The computation circuit measures a frequency of the pulse detected by the pulse detection circuit, and the computation circuit computes the revolution speed of the motor M. The revolution speed Po of the motor M, detected by the revolution speed detection unit 11, is inputted to the boosting control unit 7. As shown in FIG. 8, in the boosting control unit 7, two thresholds P1 (first threshold) and P2 (second threshold) are set as the threshold to the revolution speed Po. A relationship of P1<P2 holds between P1 and P2. For example, P1 is set to P1=Pm×90% and δ2 is set to P2=Pm×95% with respect to the maximum revolution speed Pm.

In the above configuration, the current target value computation unit 1 is an embodiment of the target value computation means in the invention, the command value computation unit 2 is an embodiment of the command value computation means in the invention, the PWM control unit 3 and the motor drive circuit 4 are an embodiment of the motor drive means in the invention, the boosting control unit 7 is an embodiment of the judgment means, rate-of-change computation means, and boosting control means in the invention, the current detector 8 is an embodiment of the current detection means in the invention, and the revolution speed detection unit 11 is an embodiment of the revolution speed detection in the invention.

FIG. 8 is a graph showing an example of the boosting control. A horizontal axis indicates the time, and a vertical axis indicates the motor revolution speed Po detected by the revolution speed detection unit 11. The numerals P1 and P2 designate the threshold. FIG. 8 is basically similar to FIG. 2, and FIG. 8 differs from FIG. 2 only in that the computed duty ratio Do in the vertical axis of FIG. 2 is replaced by the motor revolution speed Po in FIG. 8 and the thresholds δ1 and δ2 in FIG. 2 is replaced by the thresholds P1 and P2 in FIG. 8. Accordingly, FIG. 5 will briefly be described below.

In FIG. 8, in the range A, because the motor revolution speed Po does not reach the threshold P1, the boosting control unit 7 does not output the boosting signal and the boosting circuit 6 does not perform the boosting operation. In the range B, the motor revolution speed Po exceeds the threshold P1 and the rate of change also has the positive value. Therefore, the boosting control unit 7 outputs the boosting signal and the boosting circuit 6 performs the boosting operation. In the part C1 of the range C, although the motor revolution speed Po exceeds the threshold P1, the rate of change has the negative value. Therefore, the output of the boosting signal is stopped and the boosting operation is not performed. In the part C2, because the motor revolution speed Po falls below the threshold P1, the voltage is not boosted. In the part C3, although the motor revolution speed Po shifts to the increase, the motor revolution speed Po does not reach the threshold P1. Therefore, the boosting operation is still stopped. In the part D1 of the range D, the motor revolution speed Po exceeds the threshold P1 and the motor revolution speed Po is continuously increased, so that the voltage is boosted. In the part D2, the motor revolution speed Po exceeds the threshold P2 and the motor revolution speed Po is continuously increased, so that the boosting operation is continued. In the part D3, the motor revolution speed Po exceeds the threshold P2. Therefore, due to the above-described reason, the boosting operation is continued although the motor revolution speed Po shifts to the decrease. In the part E1 of the range E, the motor revolution speed Po falls below the threshold P2 and the motor revolution speed Po is continuously decreased, so that the boosting operation is stopped. In the part E2, because the motor revolution speed Po falls below the threshold P1, the stopped state of the boosting is continued.

Figure 9:
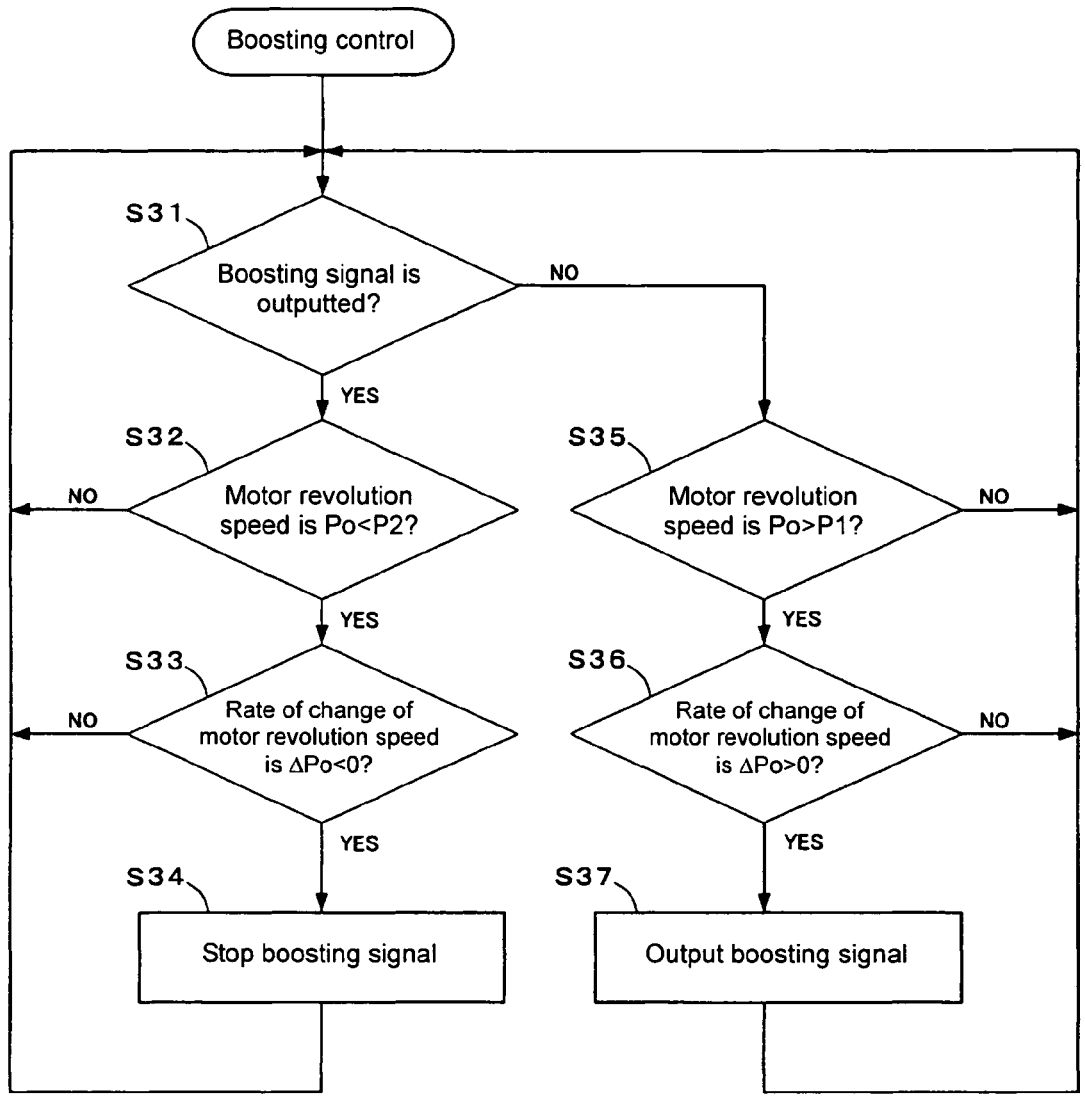
FIG. 9 shows a flowchart illustrating a procedure of the boosting control according to the third embodiment.

FIG. 9 is a flowchart showing a procedure of the boosting control according to the third embodiment. The procedure shown in FIG. 9 shows a procedure performed by the boosting control unit 7. In Step S31, it is judged whether or not the boosting signal is outputted from the boosting control unit 7. When the boosting signal is outputted (Step S31: YES), the flow goes to Step S32 to judge whether or not the motor revolution speed Po falls below the threshold P2. When the motor revolution speed Po does not fall below the threshold P2 (Step S32: NO), the output of the boosting signal is continued (parts D2 and D3 of FIG. 8), and the flow returns to Step S31. When the motor revolution speed Po falls below the threshold P2 (Step S32: YES), the flow goes to Step S33 to judge whether or not a rate of change ΔPo of the motor revolution speed Po has the negative value. When the rate of change ΔPo has the positive value (Step S33: NO), the output of the boosting signal is continued (parts B and D1 of FIG. 8), and the flow returns to Step S31. When the rate of change ΔPo has the negative value (Step S33: YES), the flow goes to Step S34 to stop the boosting signal (parts C1 and E1 of FIG. 8), and the flow returns to Step S31.

When the boosting signal is not outputted in Step S31 (Step S31: NO), the flow goes to Step S35 to judge whether or not the motor revolution speed Po exceeds the threshold P1. When the motor revolution speed Po does not exceed the threshold δ1 (Step S35: NO), the stop of the boosting signal is continued (parts A, C2, C3, and E2 of FIG. 8), and the flow returns to Step S31. When the motor revolution speed Po exceeds the threshold P1 (Step S35: YES), the flow goes to Step S36 to judge whether or not the rate of change ΔPo of the motor revolution speed Po is the positive value. When the rate of change ΔPo is negative value (Step S36: NO), the stop of the boosting signal is continued (parts C1 and E1 of FIG. 8), and the flow returns to Step S31. When the rate of change ΔPo is the positive value (Step S36: YES), the flow goes to Step S37 to output the boosting signal (parts B and D1 of FIG. 8), and the flow returns to Step S31.

Thus, in the third embodiment, whether or not the boosting is required is not judged based only on whether or not the motor revolution speed Po exceeds the threshold, but, in addition to this, the whether or not the boosting is required is also judged based on the rate of change ΔPo of the motor revolution speed Po to the time. Therefore, even if the motor revolution speed Po exceeds the threshold P1, in a case where it is judged from the rate of change ΔPo that the boosting is not required (C1 and E1 of FIG. 8), the boosting operation can be stopped to eliminate the wasteful power loss in the boosting circuit 6.

In the third embodiment, the two thresholds P1 and P2 are used as the threshold. In a case where the motor revolution speed Po exceeds the threshold P1, the boosting circuit 6 is controlled so as to boost the voltage when the rate of change ΔPo of the motor revolution speed has the positive value (parts B and D1 of FIG. 8), and the boosting circuit 6 is controlled not so as to boost the voltage when the rate of change ΔPo has the negative value (parts C1 and E1 of FIG. 8). On the other hand, in a case where the motor revolution speed Po exceeds the threshold P2 (parts D2 and D3 of FIG. 8), the boosting circuit 6 is controlled so as to boost the voltage independently of the positive or negative value of the rate of change ΔDo of the computed duty ratio. Accordingly, even if the motor revolution speed Po exceeds the threshold P1, in a case where the motor revolution speed Po is decreased, the boosting operation can be stopped to eliminate the wasteful power loss. In a case where the motor revolution speed Po exceeds the threshold P2, because the boosting operation is not stopped even if the motor revolution speed Po is decreased, the boosted voltage can stably be supplied to the motor M.

Because the threshold P1 of the motor revolution speed is set at 90% of the maximum motor revolution speed Pm, as with the first embodiment, the boosting can early be started and the delay is not generated in the boosting operation. In a case where the boosting is not required after the boosting is started, the power loss can be minimized because the boosting operation is stopped at that time. Furthermore, when compared with the one threshold, the boosting control can finely be performed by setting the two thresholds P1 and P2.

Figure 10:
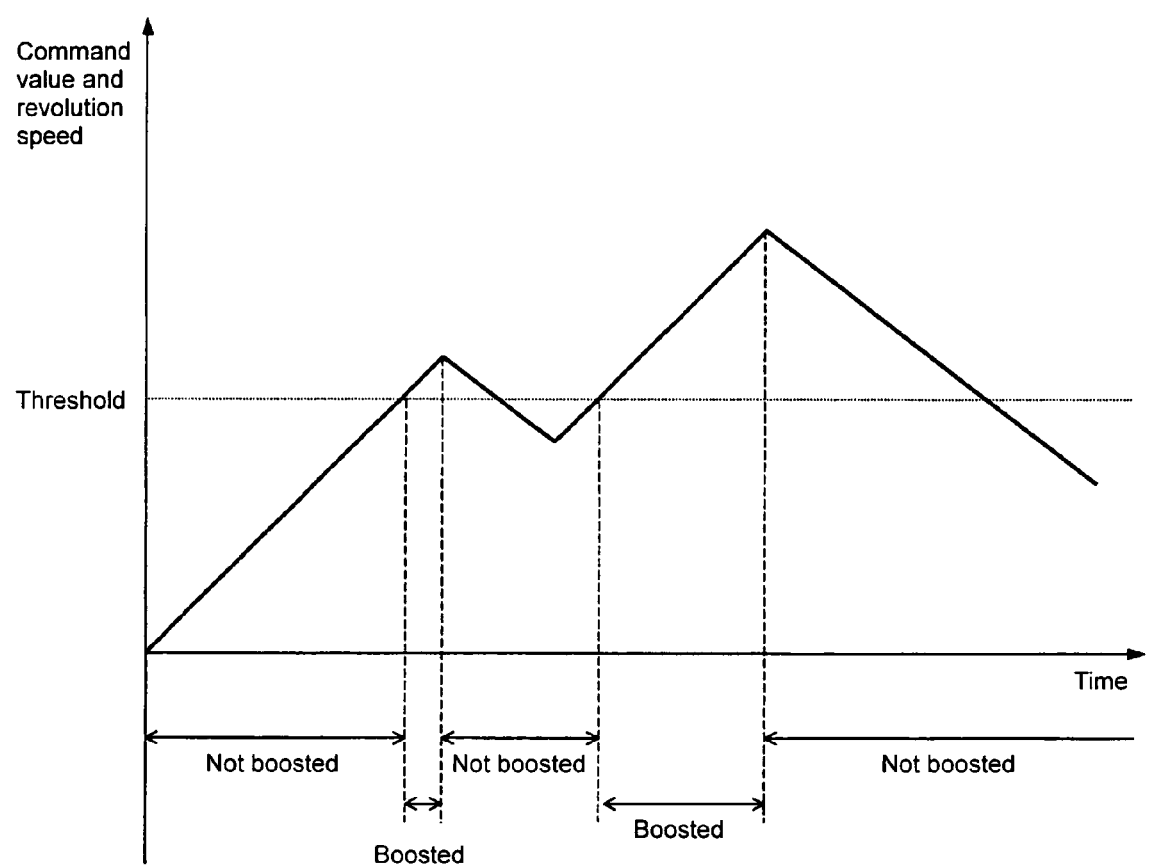
FIG. 10 shows a graph illustrating another example of the boosting control.

In addition to the above embodiments, various modes can be adopted in the invention. For example, in the above embodiments, the two thresholds are used to perform the boosting control. However, it is not always necessary to use the two thresholds in the invention. As shown in FIG. 10, the one threshold may be set to the command value or the revolution speed (hereinafter typified by command value) to perform the boosting control. In FIG. 10, the voltage is not boosted in a case where the command value does not exceed the threshold. In a case where the command value exceeds the threshold, the boosting circuit 6 performs the boosting when the rate of change of the command value has the positive value (increase), and the boosting circuit 6 does not perform the boosting when the rate of change of the command value has the negative value (decrease).

In the above embodiments, after the command value or the revolution speed exceeds the first threshold, the boosting is stopped at the time the command value or the revolution speed shifts to the decrease, i.e., at the time the change of rate of the command value or the revolution speed becomes negative. Alternatively, it is monitored whether or not the negative state of the rate of change is continued for a predetermined period, the boosting is maintained until the negative state is continued for the predetermined period, and the boosting may be stopped at the time the negative state is continued for the predetermined period.

In the third embodiment, the revolution speed detection unit 11 including the rotary encoder and the pulse detection circuit is provided to detect the revolution speed of the motor M. Alternatively, a revolution speed detection unit for detecting the motor revolution speed based on the current value detected by the current detector 8 may be provided.

In the above embodiments, the invention is applied to the electric power steering apparatus. However, the motor control apparatus of the invention can be applied also to an apparatus other than the electric power steering apparatus.

What is claimed is:
1. A motor control apparatus comprising:
a target value computation device for computing a target value of a current passed through a motor;
a current detection device for detecting a current passed through the motor, to output a current value thereof;
a command value computation device for computing a command value to the motor based on a deviation between the current target value computed by the target value computation device and the current value detected by the current detection device;
a motor drive device for driving the motor based on the command value computed by the command value computation device;
a boosting circuit which boosts a voltage supplied to the motor;
a judgment device for judging whether or not the command value computed by the command value computation device exceeds a predetermined threshold;
a rate-of-change computation device for computing a rate of change of the command value to time; and
a boosting control device for controlling a boosting operation of the boosting circuit based on a judgment result by the judgment device and the rate of change of the command value computed by the rate-of-change computation device.

2. A motor control apparatus according to claim 1, wherein, in a case where the judgment device judges that the command value exceeds the predetermined threshold, the boosting control device controls the boosting circuit so as to boost the voltage supplied to the motor when the rate of change of the command value computed by the rate-of-change computation device is a positive value, and controls the boosting circuit so as not to boost the voltage supplied to the motor when the rate of change of the command value computed by the rate-of-change computation device is a negative value.

3. A motor control apparatus according to claim 1, wherein the threshold includes a first threshold and a second threshold,
in a case where the judgment device judges that the command value exceeds the first threshold, the boosting control device controls the boosting circuit so as to boost the voltage supplied to the motor when the rate of change of the command value is a positive value, and controls the boosting circuit so as not to boost the voltage supplied to the motor when the rate of change of the command value is a negative value, and
in a case where the judgment device judges that the command value exceeds the second threshold, the boosting control device controls the boosting circuit so as to boost the voltage supplied to the motor independently of the positive or negative value of the rate of change of the command value.

4. A motor control apparatus comprising:
a target value computation device for computing a target value of a current passed through a motor;
a current detection device for detecting a current passed through the motor, to output a current value thereof;
a command value computation device for computing a command value to the motor based on a deviation between the current target value computed by the target value computation device and the current value detected by the current detection device;

a motor drive device for driving the motor based on the command value computed by the command value computation device;

a boosting circuit which boosts a voltage supplied to the motor;

a voltage detection device for detecting a power supply voltage of the motor;

a threshold determination device for determining a threshold based on the motor power supply voltage detected by the voltage detection device;

a judgment device for judging whether or not the command value computed by the command value computation device exceeds the threshold determined by the threshold determination device;

a rate-of-change computation device for computing a rate of change of the command value to time; and a boosting control device for controlling a boosting operation of the boosting circuit based on a judgment result by the judgment device and the rate of change of the command value computed by the rate-of-change computation device.

5. A motor control apparatus according to claim 4, wherein, in a case where the judgment device judges that the command value exceeds the predetermined threshold, the boosting control device controls the boosting circuit so as to boost the voltage supplied to the motor when the rate of change of the command value computed by the rate-of-change computation device is a positive value, and controls the boosting circuit so as not to boost the voltage supplied to the motor when the rate of change of the command value computed by the rate-of-change computation device is a negative value.

6. A motor control apparatus according to claim 4, wherein the threshold includes a first threshold and a second threshold, in a case where the judgment device judges that the command value exceeds the first threshold, the boosting control device controls the boosting circuit so as to boost the voltage supplied to the motor when the rate of change of the command value is a positive value, and controls the boosting circuit so as not to boost the voltage supplied to the motor when the rate of change of the command value is a negative value, and in a case where the judgment device judges that the command value exceeds the second threshold, the boosting control device controls the boosting circuit so as to boost the voltage supplied to the motor independently of the positive or negative value of the rate of change of the command value.

7. A motor control apparatus comprising:

a target value computation device for computing a target value of a current passed through a motor;

a current detection device for detecting a current passed through the motor, to output a current value thereof;

a command value computation device for computing a command value to the motor based on a deviation between the current target value computed by the target value computation device and the current value detected by the current detection device;

a motor drive device for driving the motor based on the command value computed by the command value computation device;

a boosting circuit which boosts a voltage supplied to the motor;

a revolution speed detection device for detecting revolution speed of the motor;

a judgment device for judging whether or not the motor revolution speed detected by the revolution speed detection device exceeds a predetermined threshold;

a rate-of-change computation device for computing a rate of change of the revolution speed to time; and a boosting control device for controlling a boosting operation of the boosting circuit based on a judgment result by the judgment device and the rate of change of the revolution speed computed by the rate-of-change computation device.

8. A motor control apparatus according to claim 7, wherein in a case where the judgment device judges that the revolution speed exceeds the predetermined threshold, the boosting control device controls the boosting circuit so as to boost the voltage supplied to the motor when the rate of change of the revolution speed computed by the rate-of-change computation device is a positive value, and controls the boosting circuit so as not to boost the voltage supplied to the motor when the rate of change of the revolution speed computed by the rate-of-change computation device is a negative value.

9. A motor control apparatus according to claim 8, wherein the threshold includes a first threshold and a second threshold, in a case where the judgment device judges that the revolution speed exceeds the first threshold, the boosting control device controls the boosting circuit so as to boost the voltage supplied to the motor when the rate of change of the revolution speed is a positive value, and controls the boosting circuit so as not to boost the voltage supplied to the motor when the rate of change of the revolution speed is a negative value, and in a case where the judgment device judges that the revolution speed exceeds the second threshold, the boosting control device controls the boosting circuit so as to boost the voltage supplied to the motor independently of the positive or negative value of the rate of change of the revolution speed.

* * * * *